J. T. McCROSSON.
MOTOR VEHICLE LOAD COMPENSATOR.
APPLICATION FILED DEC. 20, 1916.

1,244,752.

Patented Oct. 30, 1917.
2 SHEETS—SHEET 1.

INVENTOR.
J. T. McCROSSON
BY
Carlos P. Griffin
ATTORNEY.

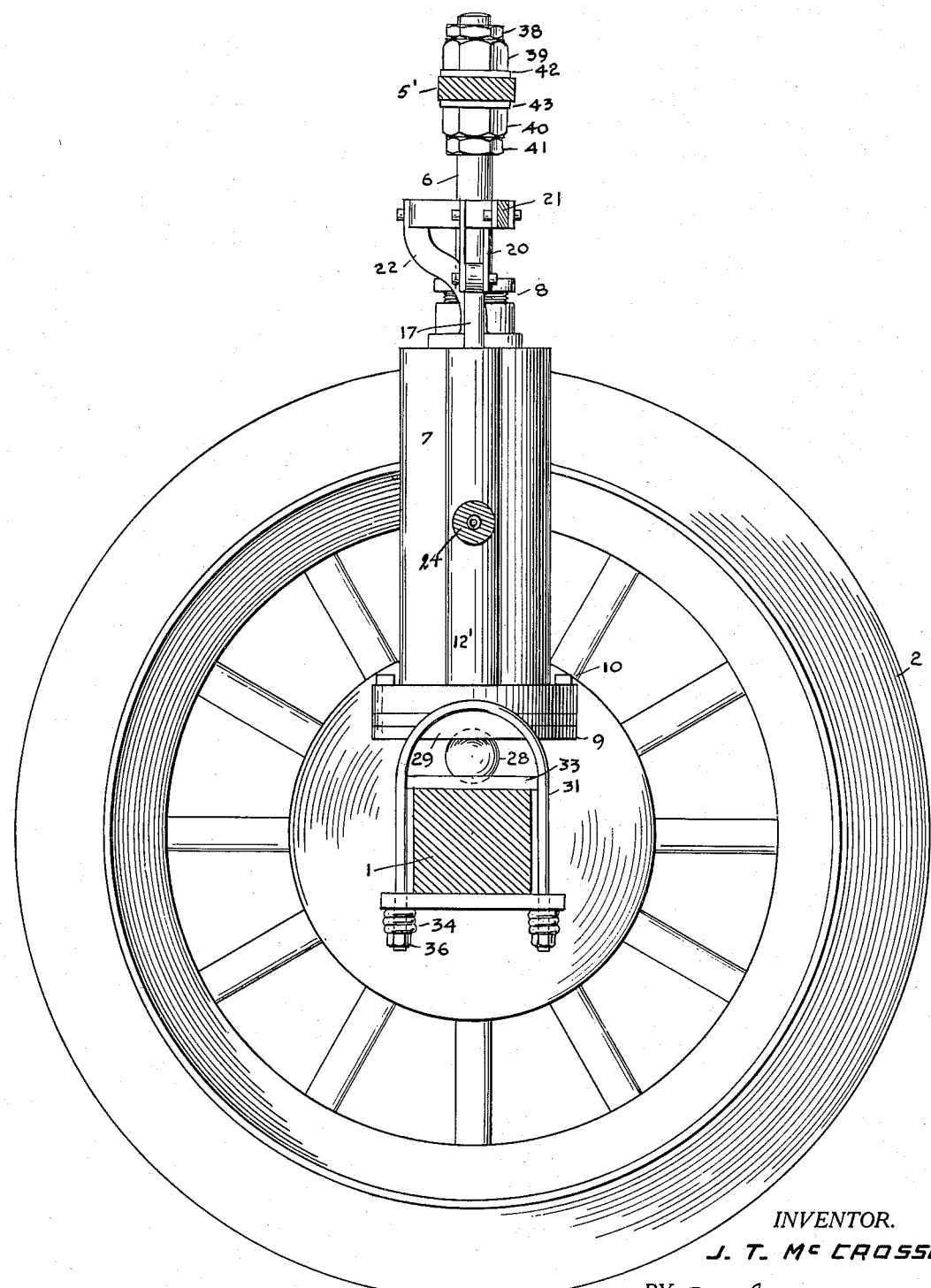

UNITED STATES PATENT OFFICE.

JOHN T. McCROSSON, OF HONOLULU, TERRITORY OF HAWAII.

MOTOR-VEHICLE LOAD-COMPENSATOR.

1,244,752.     Specification of Letters Patent.     Patented Oct. 30, 1917.

Application filed December 20, 1916. Serial No. 138,088.

*To all whom it may concern:*

Be it known that I, JOHN T. MCCROSSON, a citizen of the United States, residing at Honolulu, in the Territory of Hawaii, have invented a new and useful Motor-Vehicle Load - Compensator, of which the following is a specification in such full and clear terms as will enable those skilled in the art to construct and use the same.

This invention relates to a compensating device for motor vehicles, the object of which is to resiliently restrain the load carrying frame of the vehicle within certain limits whereby the action of the load on the springs is so relieved as to prevent injury thereto.

It will be understood by those skilled in the art that the springs of all kinds of vehicles are broken as often upon the up-throw when the vehicle has struck a bump as they are on the down throw when the bump has been struck, so that this invention seeks to provide means whereby the springs cannot be unduly depressed or lifted, and will be cushioned at both ends of their greatest throw, thereby improving the riding of the vehicle as well as lengthening the life of the springs.

This invention refers to an improvement upon my Patent Number 1,179,015 granted April 11th, 1916.

Another object of the invention is to provide means for connecting the apparatus with the vehicle with suitable flexible connections whereby the necessary movement of the axle with respect to the loading carrying frame may be allowed without injury either to the vehicle or to the load compensating apparatus.

Other objects of the invention will appear as the description proceeds.

An embodiment of the invention is shown in the drawing in which the same reference numeral is applied to the same portion throughout, but I am aware that there may be many modifications thereof.

Fig. 2 is a side elevation of the apparatus looking away from the vehicle frame, and with the adjacent spring removed on line 2—2, Fig. 1.

Figure 1:
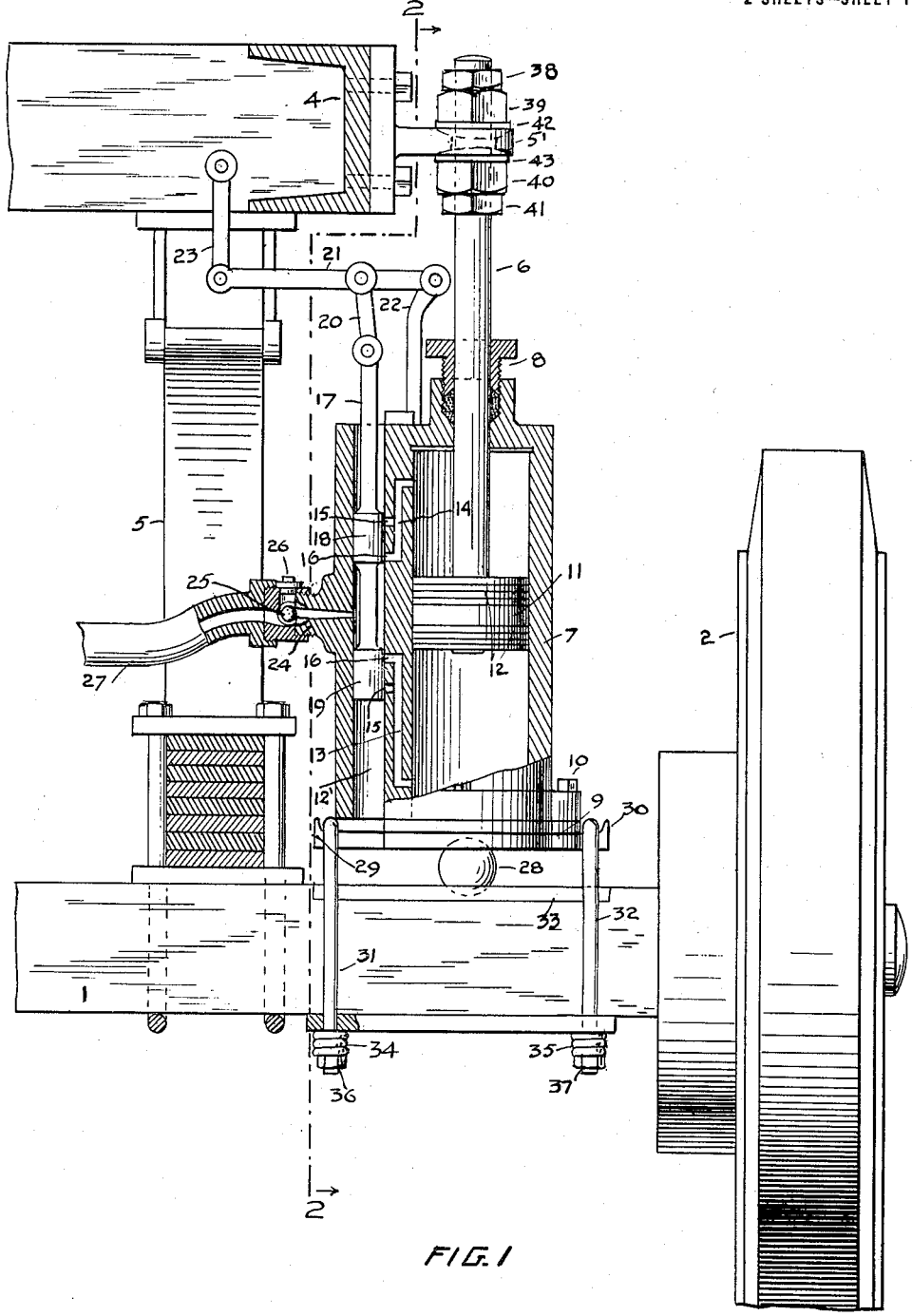
Figure 1 is a view looking from the rear of the vehicle with a portion of this apparatus shown in section.

The numeral 1 indicates the vehicle axle which is provided with wheels 2 and 3, said wheels being of a well known type suitable for the desired use. The frame of the vehicle is of any suitable form as indicated at 4, and is supported by means of the springs 5, said springs being of such shape as may be deemed desirable for the given use. The side frame has a bracket 5' secured thereto through which the piston rod 6 extends. The piston rod extends into a cylinder 7 having a packing gland 8, and which cylinder is provided with a removable bottom 9, the latter being secured to the cylinder by means of a suitable series of bolts as indicated at 10. The piston rod has a piston 11 thereon, which carries suitable piston rings 12. At one side the cylinder 7 has a passage way open to the atmosphere as indicated at 12, and this passage way is connected by means of the ports 13 and 14 with the bottom and top respectively of the cylinder 7 in which the piston 11 moves. The ports 13, 14 each have an air escape opening 15, and an air inlet opening 16. Movable in the passage way 12 is a valve rod 17 which valve rod is provided with a piston valve 18 at its middle portion and a piston valve 19 at its lower end. At the upper end of the rod 17 it is connected by means of a link 20 with a lever 21 pivoted to a bracket 22 secured on the top of the cylinder 7. The other end of the lever 21 is connected by means of a link 23 with the frame of the vehicle, and the leverages are so arranged that the piston rod 17 has one half the travel of the vehicle frame. On the side of the cylinder 7 near the middle thereof is a boss 24 within which is a ball 25 to operate as a check valve, and plug 26 serving to admit said ball to its chamber. The boss 24 is connected by means of a suitable tube 27 with a source of air supply, not shown and forming no part of the present invention. The lower end of the cylinder 7 rests upon a ball 28, and the removable bottom 9 is provided with projecting ears 29, 30, which serve in conjunction with the U clips 31, 32, to hold the compensating apparatus in a substantially fixed position with respect to the axle of the machine. The ball 28 rests upon a suitable wear plate 33 on the top of the axle 1. In order to provide for lateral wear of the vehicle frame, heavy spring washers 34, 35 are inserted above the nuts 36, 37, which hold the U clips in place. The piston rod 6 passes through the bracket 5', and is connected therewith by means of four nuts 38, 39, 40, 41, two washers 42 and 43 being interposed between the nuts and bracket 5', and the hole through which the rod passes being large enough to allow certain freedom of movement of the vehicle frame with respect to said rod to permit the frame to sway to the side or forward and back as may be required in the travel of the vehicle. Assuming the tube 27 to be maintained under a suitable air pressure at all times, the result of the foregoing construction is that as soon as the vehicle is loaded a sufficient amount for the piston valve 19 to open the lower port 16 air under pressure will be delivered below the piston 11 and will tend to hold the vehicle frame at that particular level. Additional loading will serve to additionally charge the cylinder 7 below the piston 11 and thereby bring it to its normal position. After the vehicle is loaded, as it travels over the road any undue bumping will cause the descent of the vehicle frame and will additionally charge the cylinder below the piston 11. If the bump is so heavy as to throw the frame violently upward, the upper piston valve 18 will close the upper port 15 and will open the upper port 16 thereby allowing a charge of compressed air to pass into the cylinder above the piston 11 thereby preventing the frame from rising higher than it should. Either one or the other of the ports 15 are under normal conditions opened to the atmosphere upon slight movements of the vehicle frame so that they release the air when under pressure thereon if the movement is more than it should be in the opposite direction thereby further tending to maintain the entire apparatus in a condition of equilibrium.

Having thus described my invention what I claim as new and desire to secure by Letters Patent of the United States, is as follows:—

1. A vehicle load compensator comprising the combination with a vehicle frame and supporting axle of an air cylinder, a piston therein, flexible connections between the frame and axle with the piston and cylinder, means to deliver air under pressure above or below the piston to prevent excessive action of the frame when the vehicle is moving, and a valve for admitting air above or below the piston to increase the pressure in the cylinder as the piston moves up or down.

2. A vehicle load compensator comprising the combination with the frame and supporting axle of a vehicle of an air cylinder, a piston therein, flexible connections between the frame and axle with the piston and cylinder, means to deliver air under pressure above or below the piston to prevent excessive movements of the frame when the vehicle is moving, and means whereby the pressure in one end of the cylinder is restored to atmospheric when an excessive movement of the frame is made toward the other end of the cylinder.

3. A vehicle load compensator comprising the combination with the frame and supporting axle of a vehicle of an air cylinder, a piston therein, flexible connections between the frame and axle with the piston and cylinder, means to deliver air under pressure above or below the piston to prevent excessive movement of the frame when the vehicle is moving, a valve closing ports in the cylinder, links connecting the vehicle body and valve so constructed and arranged that the pressure in one end of the cylinder is restored to atmospheric when an excessive movement of the frame occurs toward the opposite end of the cylinder, and a mechanical spring for carrying the ordinary load of the frame on the axle.

4. A vehicle load compensator comprising the combination with the frame and supporting axle of a vehicle of a supporting spring, an air cylinder, a piston therein, flexible connections between the piston and air cylinder with the axle and frame, a source of compressed air supply, a double valve and connections with the frame and said valve whereby the valve will deliver air under pressure to said cylinder above or below the piston to prevent excessive movement of the vehicle frame in either direction.

5. A vehicle load compensator comprising the combination with the frame and supporting axle of a vehicle of a supporting spring carrying the frame over the axle, an air cylinder, a piston therein, flexible connections between the frame and axle with the piston and cylinder, a source of compressed air supply, a vertically movable double valve adapted to close ports into the air cylinder and a series of links whereby the valve will deliver air under pressure to the air cylinder above or below the piston to prevent excessive movements of the frame, the ports in said cylinder being so arranged as to allow the air therein to be restored to atmospheric pressure in one end of the cylinder when an excessive movement of the piston takes place toward the other end of the cylinder.

In testimony whereof I have hereunto set my hand this 12th day of December A. D. 1916.

JOHN T. McCROSSON.